UNITED STATES PATENT OFFICE.

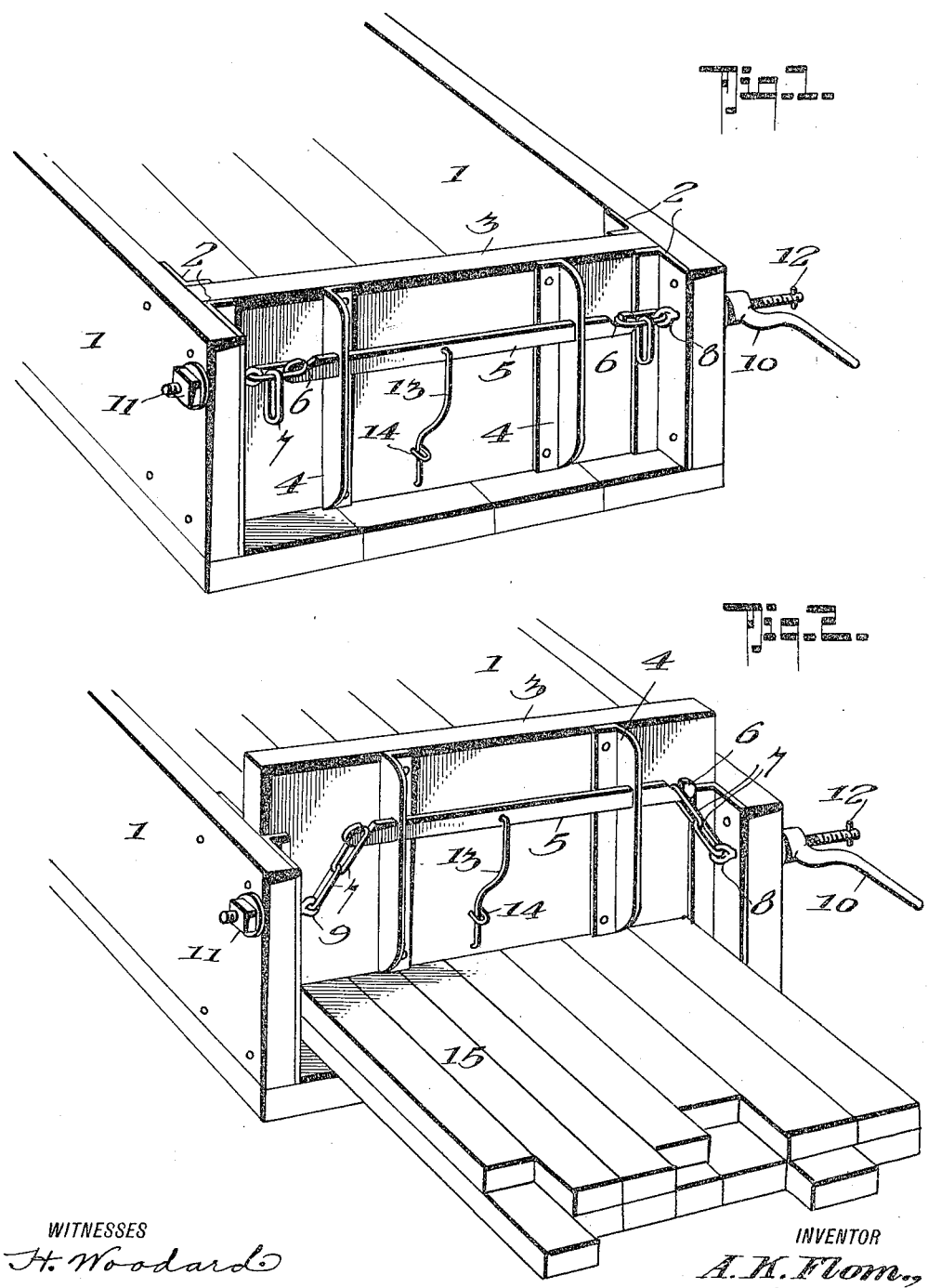

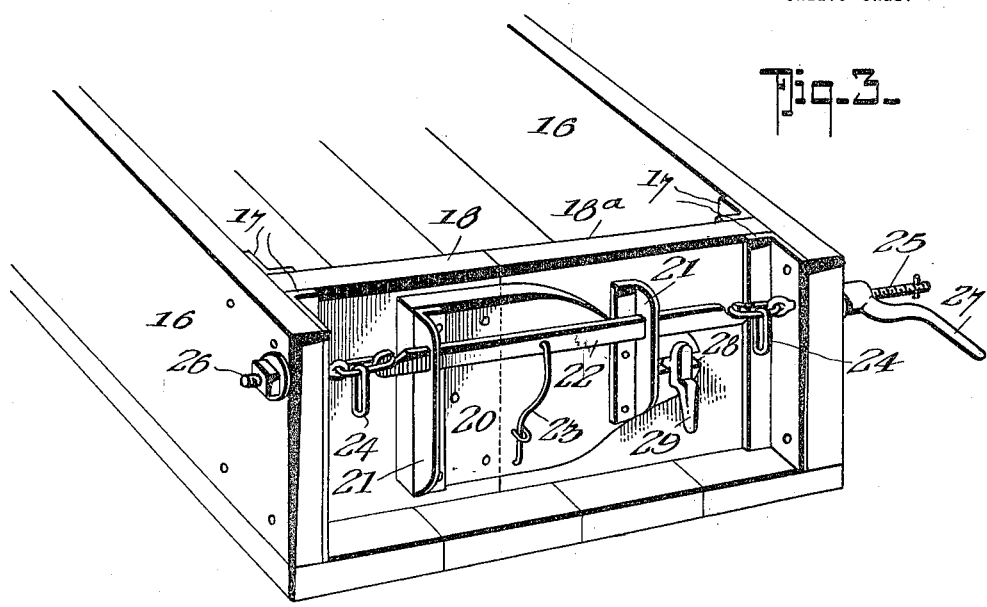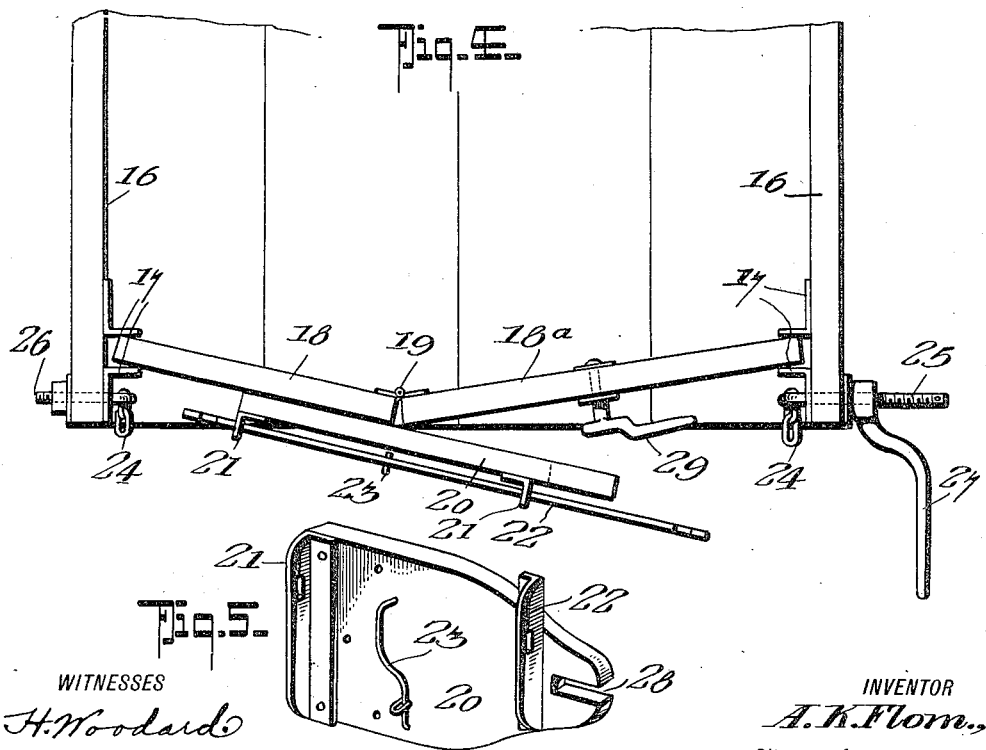

ANDREW K. FLOM, OF MONTEVIDEO, MINNESOTA.

END-GATE.

1,311,644.  Specification of Letters Patent.  Patented July 29, 1919.

Application filed December 21, 1918. Serial No. 267,825.

*To all whom it may concern:*

Be it known that I, ANDREW K. FLOM, a citizen of the United States, and a resident of Montevideo, in the county of Chippewa and State of Minnesota, have invented certain new and useful Improvements in End-Gates, of which the following is a specification.

My invention is an improvement in end gates for wagons and the like, and has for its object to provide a gate of the character specified, wherein means is provided for tightly clamping the side boards upon the ends of the gate to hold the gate in lowered or partly raised position, and by means of which the said boards may be held from spreading when the gate is not in place.

In the drawings:

Figure 1 is a perspective plan view of the rear end of a wagon box showing one embodiment of the invention;

Fig. 2 is a similar view with the gate partly raised;

Fig. 3 is a similar view showing another form of gate;

Fig. 4 is a top plan view of the construction in Fig. 3 with the gate open;

Fig. 5 is a perspective view of the locking plate for the gate sections.

In the embodiment of the invention shown in Figs. 1 and 2, the side boards 1 of the wagon box have pairs of angle plates 2 arranged at their rear ends in vertical position, the members of the pairs being spaced apart to form guide ways for receiving the ends of an end gate 3. This gate, which is of usual construction, has upon the outer face thereof a pair of angle plates 4, the said plates being secured transversely of the gate, each with one portion of the plate extending perpendicularly to the gate, and a bar 5 is mounted to slide in registering openings in the perpendicular portions of the plates. This bar, which extends beyond the plates at each end, has its upper edges at said ends notched as indicated at 6 to form hooks for engagement by the links of a flexible member 7. Each of these flexible members is connected at one end to the eye of an eye bolt 8 and 9 respectively, and these bolts are passed through the side boards as shown. The eye bolt 8, which is of greater length than the bolt 9, has mounted thereon a handle nut 10, and an ordinary nut 11 engages the outer end of the bolt 9. This bolt 8 has a transverse pin 12 near its outer end, for limiting the outward movement of the handle nut, and it will be evident that by means of the nut 10 the side boards may be tightly clamped upon the ends of the end gate, when the flexible members are engaged with the hooks at the ends of the bar 5. The bar is prevented from disengaging from the plates 4 by means of a spring 13. This spring is connected with the end gate below the bar at one end of the spring, and on the other end of the spring is an angular lug which fits within an opening in the bar. The spring is limited in its swinging movement by a staple 14 which engages over the same between its connection with the end gate and the bar. The spring will limit the longitudinal movement of the bar, permitting said limited movement, and it may be disengaged from the bar by pulling it outward at its upper end, the staple being of a length to permit this movement.

In use, when it is desired to clamp the side boards on the end gate, with the end gate in its normal position between the side boards, the flexible members 7, each of which in the present instance consists of two links, are engaged by the hooks, one link being left loose. When now the handle nut 10 is turned it will be obvious that the side boards will be clamped upon the ends of the end gate and the end gate will be firmly locked in place.

Should it be desired to partly open the gate, as for instance to permit grain to flow out of the box, or as shown in Fig. 2 to permit lengthy pieces 15 of timber to extend beyond the box body, the gate is partly raised, and the flexible members 7 are lengthened by engaging the outermost links with the hooks of the bar. When now the handle nut is turned in the proper direction with the end gate raised, it will be obvious that the side boards will be clamped upon the ends of the gate end, with the said gate partly lifted, and the end gate will be clamped in this position.

In the embodiment of the invention shown in Figs. 3, 4 and 5, the side boards 16 of the wagon box have guides 17 corresponding to the guides 2 of Fig. 1, and the end gate consists of sections 18 and 18ᵃ which are hinged together at their meeting ends as indicated at 19, to permit the said ends to swing outward between the pairs of guides 17 and a closing plate 20 is secured to the outer face of the section 18 at its inner end, the said plate when the sections are in alinement lapping upon the outer face of both sections. Angle plates 21 corresponding to the plates 4 of Fig. 1 are secured to the outer face of the plate 20, and these angle plates have registering openings for receiving the bar 22 corresponding to the bar 5 of Fig. 1. The bar is limited in its longitudinal movement by a spring 23 mounted in the same manner as the spring 13, and the hooks at the ends of the bar are adapted to be engaged by the links of chains 24, each of the said chains consisting of two links and being connected at its outer end to the eye of an eye bolt 25 and 26 respectively, the bolt 25 corresponding to the bolt 8 of Fig. 1, while the bolt 26 corresponds to the bolt 9. A handle nut 27 engages the bolt 25, and by means of the said bolt the side boards may be tightened on the end gate in the same manner as the side boards 1 are tightened on the end gate 3 of Fig. 1. The closing plate 20 has a longitudinally extending notch 28 at the free end, through which is adapted to pass a latch lever 29 to hold the locking plate 20 in place and to lock it to the section 18ᵃ of the end gate.

The operation of the construction shown in Fig. 3 is precisely the same as that shown in Fig. 1. In either construction the bar may be disengaged from the spring, merely by pulling the upper end of the spring outward. The chains are permanently attached to the eye bolts, and the angle irons 2—17 not only serve as guides but reinforce and stiffen the side boards. The provision of the two links in each chain permits the raising of the end gate for the purpose specified.

I claim:

1. In a wagon box, the combination with side boards having guides at their ends, an end gate slidable in the guides, of means for clamping the side boards on the gate, with the gate in closed or partly open position, part of said means being carried by the gate and part by the side boards, and the said parts being detachably connected, said means comprising a bar mounted to slide longitudinally on the gate, eye bolts passing through the side boards, nuts engaging the outer ends of the eye bolts, and a plurality of links connected with each eye bolt, each end of the bar having a hook for engagement by the links, and means for limiting the movement of the bar with respect to the end gate and releasable from the bar.

2. In a wagon box, the combination with side boards having guides at their ends, an end gate slidable in the guides, of means for clamping the side boards on the gate, with the gate in closed or partly open position, part of said means being carried by the gate and part by the side boards, and the said parts being detachably connected, said means comprising a bar mounted to slide longitudinally on the gate, eye bolts passing through the side boards, nuts engaging the outer ends of the eye bolts, and a plurality of links connected with each eye bolt, each end of the bar having a hook for engagement by the links.

3. In a wagon box, the combination with the side boards having guides, an end gate slidable in the guides, of means for clamping the side boards on the gate with the gate in closed or partly open position, said means comprising a bar, the gate having bearings for the bar through which it is mounted to move to permit it to be disengaged from the gate, links connected with the sideboards, the bar having hooks at its ends for engagement by the links, and releasable means connected with the gate for engaging the bar to prevent movement thereof in the bearings.

A. K. FLOM.

Copies of this patent may be obtained for five cents each, by addressing the "Commissioner of Patents, Washington, D. C."